July 25, 1950     O. C. BREWSTER     2,516,545
WEIGHING DEVICE
Filed Nov. 12, 1946
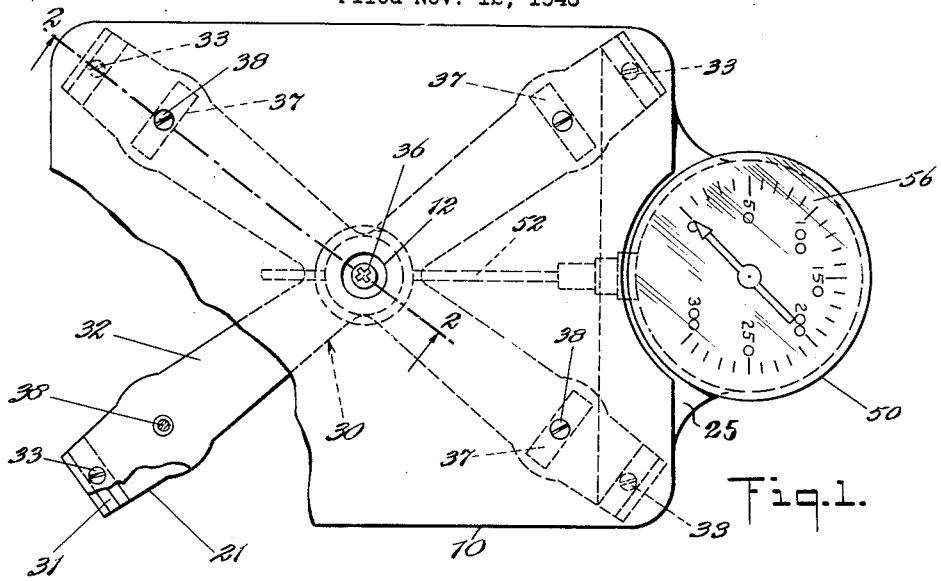
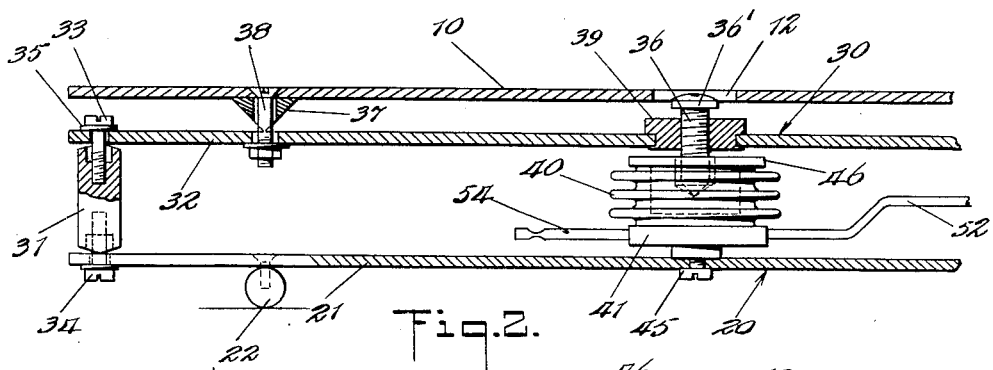
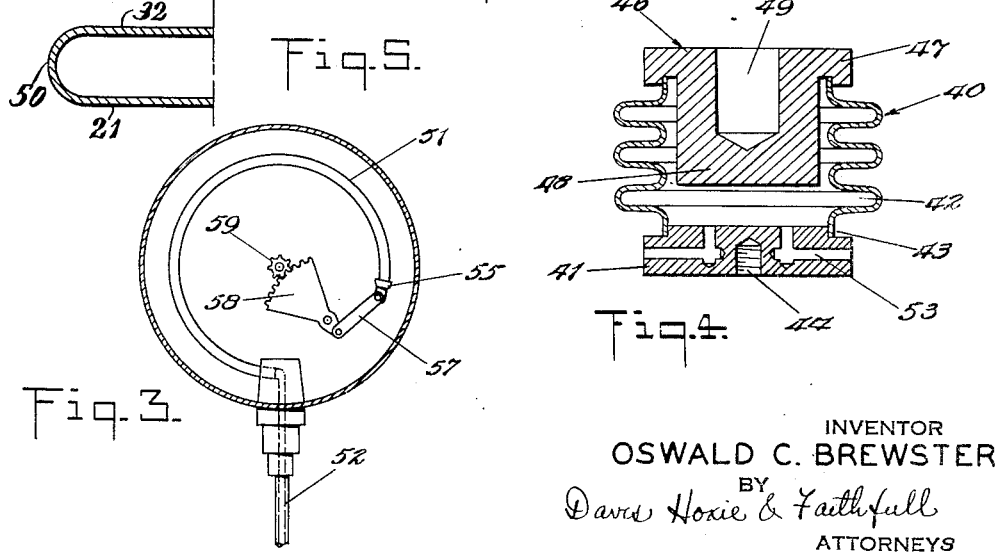
INVENTOR
OSWALD C. BREWSTER
BY
Davis Hoxie & Faithfull
ATTORNEYS Patented July 25, 1950

2,516,545

UNITED STATES PATENT OFFICE 2,516,545

WEIGHING DEVICE

Oswald C. Brewster, Litchfield, Conn.

Application November 12, 1946, Serial No. 709,114

11 Claims. (Cl. 265—47)

This invention deals with a weighing device or scale, and is here illustrated by one adapted for household use although it is not limited to that.

The aim is to make a weighing device that is simple, compact, rugged, easily made, free from loose joints causing rattles or unsteadiness, and having a high degree of accuracy, well within the limits appropriate to household use and many commercial or industrial uses.

The invention attains this object and makes possible a weighing device that is an ostensibly rigid structure having an extremely small movement of the load support for full scale deflection of the indicator.

The preferred form makes use of a fluid pressure system consisting of a Bourdon tube gage operated through a contained liquid by a metallic bellows. A force created by the load to be weighed is transmitted to the bellows to create in the fluid pressure system a pressure proportional to the load, resulting in a proportional movement of the Bourdon tube and of the needle or other indicator which the tube moves in amplified degree on a suitably calibrated scale. This takes advantage of the desirable characteristics of the combination of bellows and Bourdon tube, namely, that the Bourdon tube deflection is very accurately proportional to the fluid pressure created at the bellows, that a very slight range of deflection of the bellows occurs over a wide range of pressure variation, and that the parts are rugged, simple and easily made and assembled.

The invention also provides a simple mechanism for transmitting to the bellows a force that is so closely proportional to the load force imposed upon this transmitter as to give a high degree of accuracy. This transmitting mechanism is capable of use also with other systems of weight indication than the preferred fluid pressure system, provided they have the characteristics of this fluid pressure system which enable it to combine with the force transmitter.

This novel force-transmitting mechanism can be used either as shown here, with a load support having multiple loading points, or in a weighing device having a single loading point. Its characteristics are that it is a unitary lever arm or beam which has a fulcrum at one point, receives the load force at another point and bears on the bellows (or equivalent element) as a third point; that it is flexible and preferably somewhat resilient; and that it is capable of substantially greater deflection at its point of bearing on the bellows than is the bellows system which reacts against it. This flexible beam may be fixed at the fulcrum point to act as a cantilever without pivoting at the fulcrum and with only the deflection permitted by its inherent flexibility; but preferably it is pivotally connected to its support so that it can deflect under load force both by pivoting and by flexing. This pivotal connection is so made that it leaves no freedom for the connected parts to separate or rattle; yet the degree of restriction on free pivoting that is thereby introduced does not materially affect the accuracy of the device.

The preferred construction of a complete household scale of the so-called "bathroom" type is shown in the accompanying drawings to illustrate the invention. In these drawings:

Figure 1 is a plan view of the unit, with the load-supporting platform partly broken away;

Figure 2 is a section on the line 2—2 of Figure 1 and shows, by reference to this part of the device (duplicated in other parts) the construction and operative relation of the base, the bellows, the load-transmitting member and the load platform;

Figure 3 is a view of the interior of a conventional Bourdon gage used in the device; and Figure 4 is a sectional view of the metallic bellows unit to show its construction in greater detail.

Figure 5 is a partial sectional view of a modified construction.

In this illustrative construction, the main parts are the load platform 10; the flexible X-shaped load-force transmitting members 20 and 30, the lower of which serves also as the base 20; and the fluid pressure system consisting of the bellows 40 mounted centrally between the two force-transmitting members and the Bourdon gage 50 connected interiorly with the bellows and located at one side.

The platform 10 for supporting the load is a flat piece of stiff metal shaped at one end to expose the dial of the pressure gage 50 which is so located that the dial can be read by a person standing on the platform. The platform bears at four points on the force-transmitting member 30, as described below, and therefore loads it with the same effect regardless of where the load is placed on the platform. In a scale designed for a different duty, the load support may take a different form, including a pendent form where that is appropriate; and it may involve either a single point of loading engagement with the force-transmitting means or a multiple point system as shown here.

The flexible force transmitting mechanism here consists of two duplicate unitary X-shaped members 20, 30, one above the other, spaced and connected by upright blocks 31 at the outer ends of the arms of the X. The bellows unit 40 is held between the two at their center, and is squeezed between them when they deflect under load, much in the manner of a pair of tongs. These force-transmitting members are flexible, being stamped from hot rolled steel of about ⅛ inch thickness. Spring steel of even less thickness could be used to give the necessary flexiblity combined with sufficient strength to prevent their collapse under load.

The lower member 20 serves as the base of the scale, and has feet 22 in the form of four rubber covered metal pieces secured by machine screws to the underside of each of the arms of the X. A bracket 25 secured to the base member is the support for the Bourdon tube gage 50.

These members 20, 30 could be secured rigidly to the upright spacing blocks 31, or could be integral with them, in which case their central deflection where they engage the bellows unit 40 would depend entirely on their inherent flexibility. I prefer however to provide for substantially free pivoting of these members where they are connected to the spacers 31. As shown in Figure 2, each arm 21, 32 of these flexible X-shaped members is held to the spacer 31 by machine screws 33, 34, each with a spring washer 35; and the engaging surfaces of the spacers 31 are doubly chamfered to give a ridge or approximate knife edge engaging the arms. Further to facilitate the slight rocking or pivoting that comes when these X members are centrally deflected, the tapped holes which receive the holding screws 33, 34 are countersunk to permit some lateral movement of the screws, and in assembling the parts the screws are backed off by about an eighth turn from a fully tight position.

This or any equivalent form of connection gives a joint that is tight in the sense that the parts have no free play and can not separate or rattle, yet the arms 21, 32 are free to rock slightly and there is no material restriction of such motion. This makes it possible to use shorter arms than are needed when there is a rigid joint, and it still gives an ostensibly rigid structure.

It is not necessary that the base 20 be also a flexible force-transmitting member, for a single member (such as upper member 30) will serve to transmit the load force to the bellows if made more flexible; and in that case the base 20 can be rigid and of any desired configuration. I find it better however to employ the two-element force-transmitting structure here shown since that permits the use of less flexible members, the aggregate central deflection of which for any given load need be no more than that required of the single member when it alone serves the purpose.

The platform 20 bears on the transmitting member 30, and is supported by it, at four points one on each arm 32 of the latter. The bearing contact with each arm is through a small block 37 of triangular cross-section secured to the underside of the platform and lying across the arm it engages. This gives a knife-edge bearing. A bolt 38 extending through an enlarged hole in each arm 32 provides the same sort of connection as that already described for the joint between the force-transmitting members and their fulcrums. It holds the platform snugly against each arm 32 while allowing slight relative movement at the knife-edge as the arm deflects under load. And as in the case of the fulcrum joints, the parts are held together as an ostensibly rigid structure while permitting slight pivoting incident to the deflection of the members 20, 30 in transmitting a load force to the bellows. These loading or bearings elements 37 are located nearer to the fulcrums than to the center so that the deflection of the transmitting members at their centers is amplified in relation to the motion of the platform. When the base 20 serves, as here, as a force-transmitting member, the feet 22 are attached at the same distance from the fulcrum 31 as the loading points 37 to give the same turning moment.

The metallic bellows unit 40 has a bottom clossure 41 to which the flexible bellows element 42 is soldered at 43, and has a tap 44 into which a screw 45 is threaded to attach the unit to the base 20. The top closure 46 has a flange 47, to which the flexible element 42 is soldered, and a body portion 48 which extends well down into the flexible bellows element to minimize the quantity of contained fluid. This body portion has a large central well 49 opening to the top to receive the bearing screw 36, which is adjustable by reason of being threaded through a metal pad 39 secured to the center of the force-transmitting member 30. Its head 36' is exposed through an opening 12 at the center of the platform to permit access for adjustment.

This screw 36 bears on the bellows unit at the bottom of the well 49 and serves two purposes. It is the means by which the force-transmitting member, of which it forms a part because of its connection to the member 30, acts upon the bellows unit to compress it or to let it expand. It also serves as a means of adjustment by which the gage 50 is set accurately to a zero position corresponding to the position of the platform when not loaded. The relation of the parts is such that in that unloaded or repose condition, the gage would read below zero on its dial if the screw were just in contact with the bellows without compressing it. By turning the screw down a bit, a slight pressure is then put on the bellows to bring the gage to the zero of the dial with the platform unloaded. This gives enough leeway to permit adjustment to off-set any variation in the gage position caused by expansion or contraction of the contained fluid under the influence of changing temperature.

For some purposes, and with a fluid of low temperature co-efficient, this adjustment is not needed; and in that event the head of screw 36 would not be exposed and this bearing element of the transmitter (not necessarily a screw in that case) would be given a permanent setting such that the gage would read zero with the platform unloaded and with the contact element just touching the bellows and slightly compressing it.

The Bourdon gage 50 is of conventional construction, as shown. Its curved hollow tube 51 is connected to the interior of the bellows by tubing 52 leading to the passage 53 formed in the bottom closure of the bellows unit. Another passage to which the stub pipe 54 is connected is used in filling the bellows and Bourdon tube with the incompressible fluid, after exhausting the air, and is then permanently sealed. Within the gage is the usual mechanism for translating motion of the tip 55 of the Bourdon tube into rotary motion of the indicating needle which turns on the scale 56, this mechanism consisting of the link 57 connected to the gear segment 58 which engages the pinion 59 on the needle axis.

The entire fluid pressure system can be assembled and put in place, or removed, as a unit. By using a longer tube connecting the gage to the bellows, and a suitable support, the gage can be at a higher level closer to the eyes of a person standing on the platform.

The fluid pressure system used in this device has a very stiff spring characteristic so that only a very slight range of deflection occurs over the range of loading encountered in ordinary use of the device, say from 0 to 300 pounds. For that load capacity a bellows rated at 100 pounds or even less is suitable, giving an ample margin above the normal maximum fluid pressure of around 27 pounds; and with it may be used a Bourdon tube rated at 30 pounds. In such a system, the deflection of the bellows at full load is only about 0.008 inch. This illustrates the fact that the structure is rigid and tight for all practical purposes affecting ruggedness and freedom from the difficulties attendant upon loosely jointed structures and free knife-edge fulcrums; and yet it has within itself enough flexion to permit accurate weighing.

When a load is placed on the platform, the overall effect of course is to impose that same load on whatever support is engaged by the feet 22. The effect within the device is to cause opposing forces to be imposed on the force-transmitting members 20, 30 at the points where their arms 21, 32 are engaged by the feet 22 and by the bearing elements 37 of the platform. These transmitting members being flexible, and moreover free to rock at the spacers 31, are deflected by these forces toward each other at their centers. The bellows resists this and is thereby compressed until the fluid pressure within its system creates an equal opposing force. The resulting motion of the Bourdon gage brings its indicating element to a proportional position which, with proper calibration, shows the weight of the load. The actual motion of the force-transmitting members is very slight and is imperceptible under ordinary observation.

The accuracy of such a device depends upon the degree to which the fluid pressure in the bellows-Bourdon system, and resulting gage deflection, is proportional to the load which causes that pressure. The factors bearing on that can be understood by considering separately the fluid pressure system 40, 50 and the mechanical force transmitting system 20, 30. The fluid pressure generated by compression of the bellows is very accurately proportional to the force imposed on the bellows, because a Bourdon tube has a very sensitive and reliable spring characteristic; and the gage deflection is accurately proportional to the fluid pressure, as is well known in other uses of Bourdon gages. The design of an accurate fluid pressure system for any particular form of this weighing device therefore presents no difficulty. With accuracy assured at that end, the over-all accuracy of the device depends on the degree to which the force transmitted to the bellows and imposed on it is proportional to the load on the load support. In the design of a weighing device employing this invention it is important to observe one requirement which affects that proportionality, namely, that the capacity of the flexible force transmitting mechanism for deflection at the point where it engages the bellows must be substantially greater than that of the fluid pressure system under the same load. Otherwise put, the fluid pressure system must be substantially more resistant to deflection than is the force-transmitting mechanism at its point of engagement with the bellows.

With that substantial difference in deflectibility at the point of engagement, the bellows system resists deflection of the arm and confines it to a small part of the whole range of deflection of which it is capable, and therefore to a part which requires very little force. Hence, little of the load force is used in overcoming the resistance of the arm to deflection and there is a close approach to the ideal condition in which the ratio of the force imposed on the bellows to the load force is exactly equal to the ratio of the respective distances from the fulcrum. However, the significant requirement is not that the whole of the load force be transmitted to the bellows, but rather that the part of the load force used in overcoming the internal resistance or resilience of the transmitting member be either unvarying or else so small that the probable variations in it are of no material consequence in their effect on the proportionality of the load force to the force imposed on the bellows. Some variation in resistance to deflection is likely to come about over the life of the device, as through corrosion or dirt at the fulcrum joint, or either loosening or tightening of the joint, but the effect of such variation is made negligible by the relationship described. For example, if it is such that initially only 5% of the load force is used in overcoming the resistance of the member to deflection, a change of even 50% in that resistance will not cause an error that is material in many uses to which a scale is put.

For this reason it is not necessary for most conditions of use to employ refined methods of construction or special materials at the fulcrum or at the load bearing, or to take special precautions to protect these joints against corrosion or deposit of foreign substances. In an atmosphere of very corrosive materials, it is advisable to protect these joints by encasing them in a solid body of rubber, the flexibility of which is ample to permit the very slight pivotal movement that is involved. For most purposes, however, these joints need no protection and may undergo considerable deterioration before they introduce any such resistance to deflection as to cause a material loss of accuracy.

As to the extent of the difference in capacity for deflection (or conversely, in resistance to deflection) as between the force-transmitting member and the fluid pressure system (or its equivalent) there is no critical limit, and the extent of difference in any particular case will depend on the degree of accuracy desired. A ten-fold difference is easily attained without causing any difficulty in designing to meet other requirements, chiefly size and strength. Thus, where the fluid pressure system deflects .008" at the bellows for full load, the deflectibility of the force-transmitting mechanism where it engages the bellows can easily be made 0.08 inch or more while still giving a compact and sturdy structure.

A safe working rule is to fix the deflection characteristics of the fluid pressure system on the basis of some desired total range of deflection at the bellows, say 0.005 inch or 0.010 inch, over which an accurately proportional response can be had; and then to design the force-transmitting member, the fulcrum and the load bearing to give maximum deflectibility consistent with the strength needed to make a firm and durable structure of practical size for the intended use. The demands of the structure in respect of strength and size are such that a structure which satisfies them with an ample factor of safety will have a capacity for deflection well in excess of that of the fluid pressure system. This is especially easy with a dual force-transmitting mechanism such as that shown in which the deflectibility of each member needs to be related to only half of the deflectibility of the fluid pressure system. Moreover, even if the fulcrum or the load bearing develops increased resistance to motion of the transmitting member under unfavorable conditions of use, the deflectibility will still substantially exceed that of the bellows system and the force imposed on the bellows will be closely enough proportional to the load.

The relative importance of free pivoting at the fulcrum can be seen from the fact that in the device here shown, when there is no provision for pivoting at that point (i. e., when the transmitting member is rigidly secured to the spacer 31), the lever arm represented by the distance between the fixed support and the load bearing point has to be about 50% longer to give the same deflectibility at the center, using the same material for the transmitting member. Where the length of the arm does not matter, such a rigid support offers the advantage of complete assurance against any change in the characteristics of the system. However where the joint in that case must be such as not to work loose; and for a dual system such as shown here, an effective way to provide that type of support and joint is to provide a U-bend 50 (as in Figure 5) integral with the upper and lower force transmitting arms 21, 32, like a spring tongs.

For reasons given, the fluid pressure system employing a bellows and Bourdon tube is very much to be preferred, although from the standpoint of the force-transmitting mechanism it is not uniquely useful. Any other resilient means may be employed which has the characteristic of giving a response (as at the Bourdon tube) accurately proportional to the force transmitted to it (as at the bellows), which is capable of giving such a response over a very small range of deflection of the force-receiving element corresponding to the bellows, and which has a resistance to deflection substantially exceeding that of the force-transmitting member at their point of engagement.

I claim:

1. A weighing device comprising a load support, a weight indicator and a deflectible means having a spring characteristic for yieldably resisting an imposed force and for causing movement of the indicator in proportion to the imposed force, in combination with a unitary flexible force-transmitting lever means supported at one point, engaged by said load support at another point and engaging said deflectible means at a third point, the said transmitting means being substantially less resistant to deflection where it engages said deflectible means than is the latter whereby the force imposed on the deflectible means is closely proportional to the load.

2. A weighing device comprising a load support, a weight indicator and a fluid pressure system having a spring characteristic for moving the indicator in proportion to a force imposed on said system, the system including a deflectible force-receiving element, in combination with a unitary flexible force-transmitting lever means supported at one point, engaged by said load support at another point and engaging said deflectible element at a third point, the said transmitting means being substantially less resistant to deflection where it engages said deflectible element than is the latter, whereby the force imposed on the deflectible element is closely proportional to the load.

3. A weighing device comprising a load support, a weight indicator and a metallic bellows and Bourdon tube system with a contained fluid for moving the indicator in proportion to a force imposed on the bellows, in combination with a unitary flexible force-transmitting lever means supported at one point, engaged by said load support at another point and engaging said bellows at a third point, the said transmitting means being substantially less resistant to deflection where it engages said bellows than is the bellows system, whereby the force imposed on the bellows is closely proportional to the load.

4. A weighing device comprising a base, a load platform, a transverse flexible unitary load-transmitting member supported from the base at spaced outer points on the member and serving to support the platform at spaced inner points thereon whereby the load-transmitting member is centrally deflected by a load on the platform, in combination with a weight indicator, a deflectible element engaged by the central part of said load-transmitting member and means having a spring characteristic for moving said indicator in proportion to the force imposed on said element, said element and associated means being more resistant to deflection than the central part of the load-transmitting member itself, whereby the force imposed on said element is closely proportional to the load.

5. A weighing device comprising a base, a load platform, a transverse flexible X-shaped force-transmitting member supported from the base at an outer point on each of its arms and in supporting engagement with the load platform at an inner point on each of its arms, whereby the force-transmitting member is centrally deflected by a load on the platform, in combination with a weight indicator, a deflectible element engaged by the central part of said load-transmitting member and means having a spring characteristic for moving said indicator in proportion to the force imposed on said element, said element and associated means being more resistant to deflection than the central part of the load-transmitting member itself, whereby the force imposed on said element is closely proportional to the load.

6. A weighing device comprising a base, a load platform, a transverse flexible unitary load-transmitting member supported from the base at spaced outer points on the member and serving to support the platform at spaced inner points thereon whereby the load-transmitting member is centrally deflected by a load on the platform, in combination with a metallic bellows unit on the base and engaged by the center of the force-transmitting member, a calibrated Bourdon tube gage in communication with the bellows, and a contained incompressible fluid causing movement of the gage in proportion to the force imposed on the bellows, the bellows being substantially more resistant to deflection than is the center of the load-transmitting member whereby the force transmitted to the bellows is in close proportion to the load.

7. A weighing device comprising a base, a load platform, a transverse flexible X-shaped force-transmitting member supported from the base at an outer point on each of its arms and in supporting engagement with the load platform at an inner point on each of its arms, whereby the force-transmitting member is centrally deflected by a load on the platform, in combination with a metallic bellows unit on the base and engaged by the center of the force-transmitting member, a calibrated Bourdon tube gage in communication with the bellows, and a contained incompressible fluid causing movement of the gage in proportion to the force imposed on the bellows, the bellows being substantially more resistant to deflection than is the center of the load-transmitting member whereby the force transmitted to the bellows is in close proportion to the load.

8. A weighing device comprising a base, a load platform, a transverse flexible unitary load-transmitting member supported from the base at spaced outer points on the member and serving to support the platform at spaced inner points thereon, means at said support points connecting the base to the load-transmitting member and connecting said member to the platform, and forming therewith an ostensibly rigid structure in which the load-transmitting member is centrally deflectible, in combination with a weight indicator, a deflectible element engaged by the central part of said load-transmitting member and means having a spring characteristic for moving said indicator in proportion to the force imposed on said element, said element and associated means being more resistant to deflection than the central part of the load-transmitting member itself, whereby the force imposed on said element is closely proportional to the load.

9. A weighing device comprising a metallic bellows and calibrated Bourdon tube gage combination, with a contained incompressible fluid causing gage movement proportional to the force imposed on the bellows, in combination with a base supporting the bellows at its center, a load platform above the base and bellows, and a unitary flexible X-shaped force-transmitting member below the platform and bearing centrally on the bellows, with the platform bearing on each arm of the X member at an intermediate point along the arm, the X member being supported from the base at the outer end of each of its arms and being capable of greater deflection where it engages the bellows than is the bellows whereby the force imposed on the bellows is closely proportional to the load.

10. A weighing device comprising a load support, a weight indicator and a fluid pressure system having a spring characteristic for moving the indicator in proportion to a force imposed on the system, the system including a compressible force-receiving element, in combination with a pair of unitary flexible force-transmitting tong members engaging opposite sides of said element and being substantially less resistant to deflection where they engage it than is the element itself, and means connecting the load support to said members to cause them to compress said element in close proportion to the load.

11. A weighing device comprising a metallic bellows and calibrated Bourdon tube gage combination, with a contained incompressible fluid causing gage movement proportional to the force imposed on the bellows, in combination with a load support, a spaced pair of unitary flexible X-shaped force-transmitting members engaging opposite ends of the bellows at their centers, the said members being less resistant to deflection where they engage the bellows than the bellows system is, one of said transmitting members being engaged by the load support at intermediate points on its arms and the other having supporting feet at corresponding points.

OSWALD C. BREWSTER.

REFERENCES CITED

The following references are of record in the file of this patent:

UNITED STATES PATENTS

| Number | Name | Date |
|---|---|---|
| 1,479,581 | Berry | Jan. 1, 1924 |
| 1,895,502 | Vernet et al. | Jan. 31, 1933 |
| 2,341,173 | Bohannan | Feb. 8, 1944 |
| 2,403,204 | Feld | July 2, 1946 |

FOREIGN PATENTS

| Number | Country | Date |
|---|---|---|
| 271,314 | Great Britain | May 26, 1927 |